(12) United States Patent
Sorek et al.

(10) Patent No.: US 8,233,648 B2
(45) Date of Patent: Jul. 31, 2012

(54) AD-HOC ADAPTIVE WIRELESS MOBILE SOUND SYSTEM

(75) Inventors: Noam Sorek, Zikhron-Yaakov (IL); Eyal Toledano, Kiryat Ata (IL); Moshe Vered, Kiryat Ono (IL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1003 days.

(21) Appl. No.: 12/186,741

(22) Filed: Aug. 6, 2008

(65) Prior Publication Data

US 2010/0034393 A1 Feb. 11, 2010

(51) Int. Cl.
*H04R 5/02* (2006.01)
(52) U.S. Cl. ............... 381/311; 455/3.01; 455/426.2
(58) Field of Classification Search .................. 381/311; 455/3.01, 426.2, 554.1, 554.2, 555, 151.2, 455/557, 414.1, 556.1, 556.2, 426; 370/324, 370/337, 338, 350, 503, 508, 509, 510
See application file for complete search history.

(56) References Cited

U.S. PATENT DOCUMENTS

| | | | | |
|---|---|---|---|---|
| 7,398,049 | B2 * | 7/2008 | Blodgett et al. | 455/3.01 |
| 2005/0005025 | A1 * | 1/2005 | Harville et al. | 709/241 |
| 2005/0065907 | A1 * | 3/2005 | Chandrasekaran et al. | 707/1 |
| 2005/0080933 | A1 * | 4/2005 | Herring | 709/249 |
| 2006/0114382 | A1 | 6/2006 | Kurasawa | |
| 2007/0093239 | A1 * | 4/2007 | Camp, Jr. | 455/418 |
| 2008/0123893 | A1 * | 5/2008 | Lee | 381/376 |
| 2008/0125172 | A1 * | 5/2008 | Leon et al. | 455/557 |
| 2008/0177839 | A1 * | 7/2008 | Chang et al. | 709/205 |
| 2008/0183894 | A1 * | 7/2008 | Rai et al. | 709/248 |

OTHER PUBLICATIONS

U.S. Appl. No. 11/987,360, filed Nov. 29, 2007, Samsung Electronics Co., Ltd.

* cited by examiner

*Primary Examiner* — Cuong Q Nguyen
*Assistant Examiner* — Yosef Gebreyesus
(74) *Attorney, Agent, or Firm* — Roach Brown McCarthy & Gruber, P.C.; Kevin D. McCarthy

(57) ABSTRACT

An ad-hoc Adaptive Wireless Mobile Sound System comprises mobile phone nodes and a Master device for sending a query to the nodes, to verify whether they hold in their memory a specific song/track and to learn their music playing capabilities, for conveying to the nodes that do not have a specific file in their memory, a compressed audio stream of the file, for selecting, based on an answer to the query, an appropriate surround scheme that considers the mobile nodes capabilities, for publishing the surround scheme by which a playing role is allocated for each of the nodes, and for synchronizing the mobile nodes and to order them to play a stream audio file according to the surround scheme. In one embodiment, the Master is operable to select a compensating surround scheme when one of the nodes is found incapable of executing its allocated role during play time.

19 Claims, 6 Drawing Sheets

AD-HOC ADAPTIVE WIRELESS MOBILE SOUND SYSTEM

FIELD OF THE INVENTION

The present invention relates to the field of sound systems. More particularly, the invention relates to the use of wireless mobile devices as elements of sound systems.

BACKGROUND OF THE INVENTION

Currently there is not way that enables mobile phone holders to listen together, on an ad-hoc basis, to music, using their mobile wireless devices as elements of a sound system. While an option is known in the art, e.g., from KR Patent Application No. 2005-0035107 to play the same music, at the same time, on several mobile phones, using wireless connectivity, no solution has been provided that enables users of wireless mobile devices to play surround music using mobile phones, in a way that mimics the function of traditional stereo systems, which can use wireless connectivity between the speakers or the players.

However, before such a solution can be provided many limitations of the prior art must be overcome, such as:
1. The set speakers always play preconfigured sound configuration, thus not being suitable for ad-hoc sound;
2. When using different numbers of speakers there is no change in the sound configuration, thus, when a speaker stops playing music it immediately causes loss of sound (e.g. Left speaker has a battery low);
3. When using more than one speaker set there is no guarantee for the synchronization of the sound, thus creating an "echo effect", which usually downgrades the sound experience;
4. The sound scheme, or sound encoding, is usually predefined, meaning that changing the type of surround is virtually impossible;
5. There is a strong coupling between the speakers and the surround decoder to create the maximum effect;
6. There is usually a hard limit for the maximum number of speakers to the stereo system (2-7), depending on the type of surround.

There is therefore a need for a solution that enable will mobile phone users to meet and play the same music on an ad-hoc basis, using wireless technology.

It is an object of the present invention to provide a method and system that enables users of wireless mobile devices to play the same music, at the same time, on several mobile phones, using wireless connectivity, which overcome the limitations of the prior art.

Other objects and advantages of the invention will become apparent as this description proceeds.

SUMMARY OF THE INVENTION

The invention relates to an ad-hoc Adaptive Wireless Mobile Sound System, comprising
a) a Master device, capable of sending a message/query to one or more mobile phone nodes, to verify whether they hold in their memory a specific song/track and to learn their music playing capabilities;
b) transmission means provided in the Master, to convey to the mobile nodes that do not have a specific file in their memory, if any, a compressed audio stream of said file;
c) software suitable to convey, in a streaming fashion, the compressed audio file over wireless connectivity;
d) software provided in the Master for selecting, based on an answer to said query, an appropriate surround scheme/algorithm configuration that takes into account the mobile nodes capabilities;
e) communication means provided in the Master to publish the surround scheme/algorithm configuration by which a playing role/channel is allocated for each of the mobile nodes;
f) means provided in the Master to synchronize the mobile nodes and to order them to play a stream audio file according to the surround scheme.

In one embodiment the system of the invention supports the continuation of the music play in changing circumstances, such as the loss of a node during play time, the addition of a regular node at a later stage, or the joining of an enhanced sound node at a later stage.

In one embodiment the system is provided with means for the synchronization of each sound node that joins the sound network. In another embodiment it comprises means for performing Smart Recovery in cases when one or more of the nodes cannot execute its part.

The Master device can be a wireless mobile device or a dedicated device.

In another aspect the invention is directed to a method for the adaptive ad-hoc playing of music using a plurality of wireless mobile devices, comprising:
a) providing a Master device that sends a message/query to the mobile phone nodes, to verify whether they hold in their memory a specific song/track and to learn their music playing capabilities;
b) following this query, conveying by the Master to the mobile nodes that do not have a specific file in their memory, a compressed audio stream of said file.
c) assigning to each file a digital signature that is embedded in the file's metadata, before sending it to the client node;
d) once the Master receives an answer to his query, continuing to select an appropriate surround scheme/algorithm configuration that takes into account the mobile nodes capabilities;
e) publishing by the Master the surround scheme/algorithm configuration in which a playing role/channel is allocated for each of the mobile nodes;
f) synchronizing the mobile nodes by the Master and ordering them to play a stream audio file according to the surround scheme.

In one embodiment synchronization is carried out for each sound node that joins the sound network. In another embodiment an automatic sound configuration is performed, based on the sound capabilities of the sound nodes. Other advantages of the method may comprise providing a preference-based sound configuration, conveying sound parameters for existing surround algorithms, and providing extensions of new surround algorithms, to send surround decoding algorithms to client nodes that do not have the appropriate extension installed.

In one embodiment of the invention the method comprises handling stream data, e.g., by using standard existing protocol such as RTP/RTCP.

DETAILED DESCRIPTION OF THE INVENTION

Figure 1:
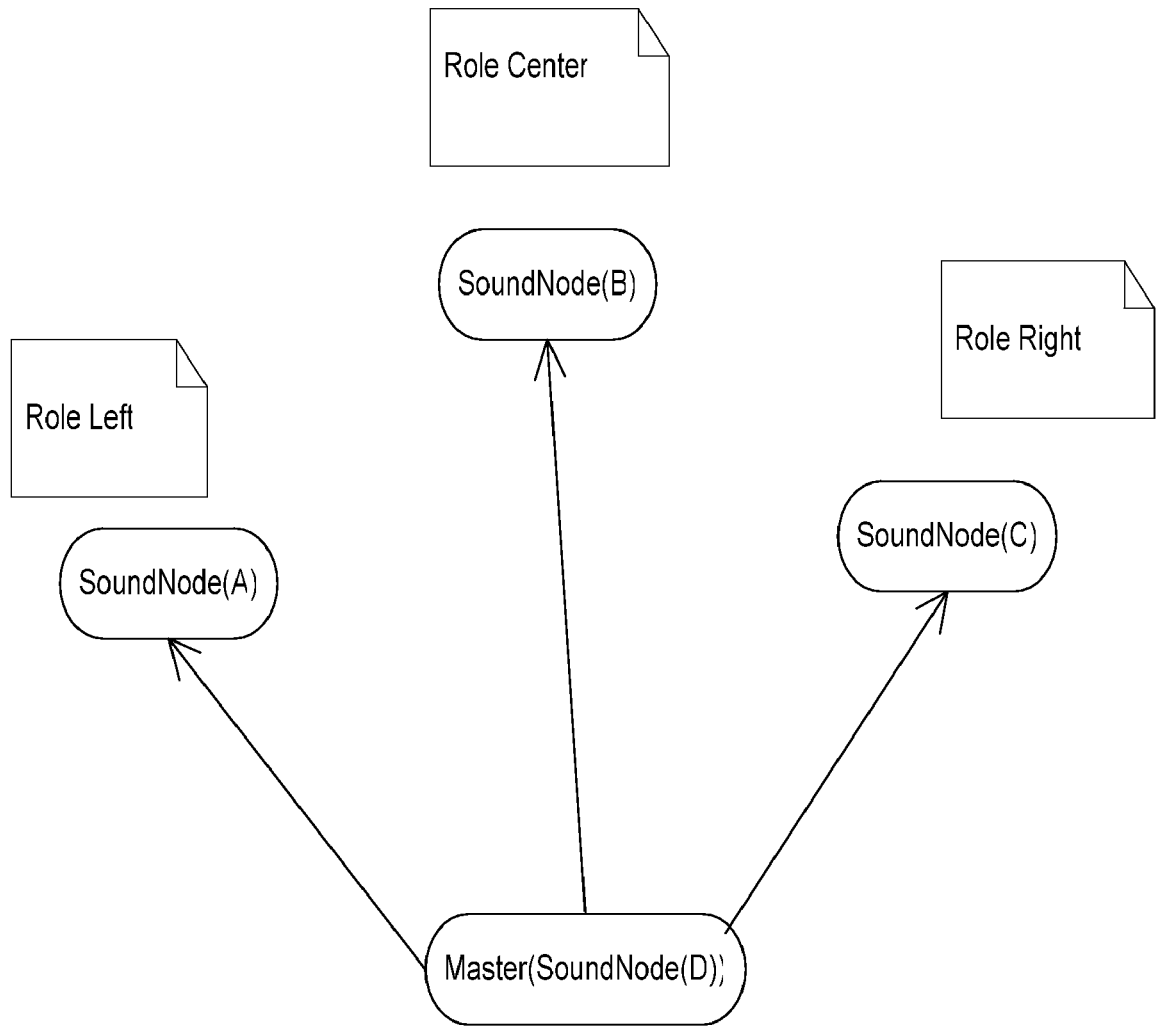
FIG. 1 schematically illustrates a typical sound network.

The invention relates to a system that includes two or more mobile/cellular phones with embedded speakers in them. Namely, each "sound node" (mobile handset), has a CPU and memory to allow it to run a wireless protocol for the scheme described hereinafter.

A software protocol enables the mobile phones users to play sound/music tracks on an ad-hoc basis over wireless connectivity, in the following manner:

Step 1: Starting Process—Discovering and Contacting Client Nodes a) The initiator of the process (hereinafter referred to also as the "Master") sends a message/query to the other mobile phone nodes, to verify whether they hold in their memory a specific song/track and to learn their music playing capabilities. Following this query, the Master conveys to the mobile nodes that do not have a specific file in their memory, a compressed audio stream (e.g. MP3) of the said file, without additional processing. Each file is assigned a digital signature that is embedded in the file's metadata, before sending it to the client node. The Master uses known methods to verify the existence/uniqueness of the file using signature as used for example in freedb and cddb [signature, name, ID, etc]. Such verification methods are well known to persons skilled in the art and are therefore not discussed herein in detail, for the sake of brevity.

b) The software protocol (as defined below) allows to convey, in a streaming fashion, the compressed audio file over wireless connectivity (e.g. BT/WiFi, which allows high bandwidth to support broadcast of wireless audio files to multiple mobile nodes).

Step 2: Select Surround Configuration a) Once the Master receives an answer to his query he then continues to select an appropriate surround scheme/algorithm configuration that takes into account the mobile nodes capabilities. [e.g. up-channeling down-mix, stereo, 3.1, 4.1, 5.1, etc].

b) Then the Master publishes the surround scheme/algorithm configuration in which a playing role/channel allocated to each of the mobile nodes. The decision of the Master should take into account the capabilities of the nodes as well as the nodes preferences. Along with the publication of the surround scheme, the Master has the option of sending a decoder (up channeling code) to the mobile nodes.

Step 3: Play Music

In this step the Master synchronizes the mobile nodes— using, for instance, the method described in U.S. patent application Ser. No. 11/987,360 filed Nov. 29, 2007, to the same assignee hereof, and orders them to play a stream audio file according to the surround scheme. The aforementioned method of U.S. Ser. No. 11/987,360 will be briefly described below.

In the context of the method of U.S. Ser. No. 11/987,360, a High Resolution Clock is a clock present at the network nodes. The time resolution of the High Resolution Clock is better than required synchronization accuracy. Such clocks are not hard to come by, since many clocks offer resolution much better than network latencies, and required synchronization accuracies are often better than network latencies. The High Resolution Clock value may or may not initialize, that is, be reset to zero, upon device startup. The synchronization method described herein, in some embodiments thereof, does not depend on the High Resolution Clock resetting to zero upon device startup.

A base time, termed herein $T_o$ ($T_{0,master}$ and $T_{0,slave}$) is an arbitrary time common to devices belonging to a synchronized group of devices, which the synchronized devices refer to as a beginning of a timeline.

A synchronization process is a process in which a master device and a slave device cooperate in setting a common base or other common time.

A master device is a device which sets the common clock. Slave devices are synchronized with the master device, therefore the slave devices are synchronized with each other as well.

A slave device is a device which participates in the synchronization process and is not the master device. There can be any number of slave devices being synchronized with a master device.

A system latency is a minimum network latency which is expected and/or measured to exist in a network. The minimum network latency, which can be, for example, measured in milliseconds, is a minimum time it takes for a packet to be sent from one network device to another. The minimum time is calculated by statistics of measured network latencies, and/or by measurements made in a laboratory.

An accuracy of the synchronization method described herein is usually better than network latency. If, for example, the network latency is always fixed, being the same in the laboratory and in actual practice, then $T_{0,slave}$ and $T_{0,master}$ can be equal. In any case, the accuracy, or difference between $T_{0,slave}$ and $T_{0,master}$, is better than any single calculation of $T_{0,slave}$ which would be made if system latency were not taken into account.

The synchronization process of U.S. Ser. No. 11/987,360 will now be described in more detail.

The synchronization process is optionally initiated either by a network node acting as a master or by a network node acting as a slave and sending a request to the master for the synchronization process to begin.

Figure 5:
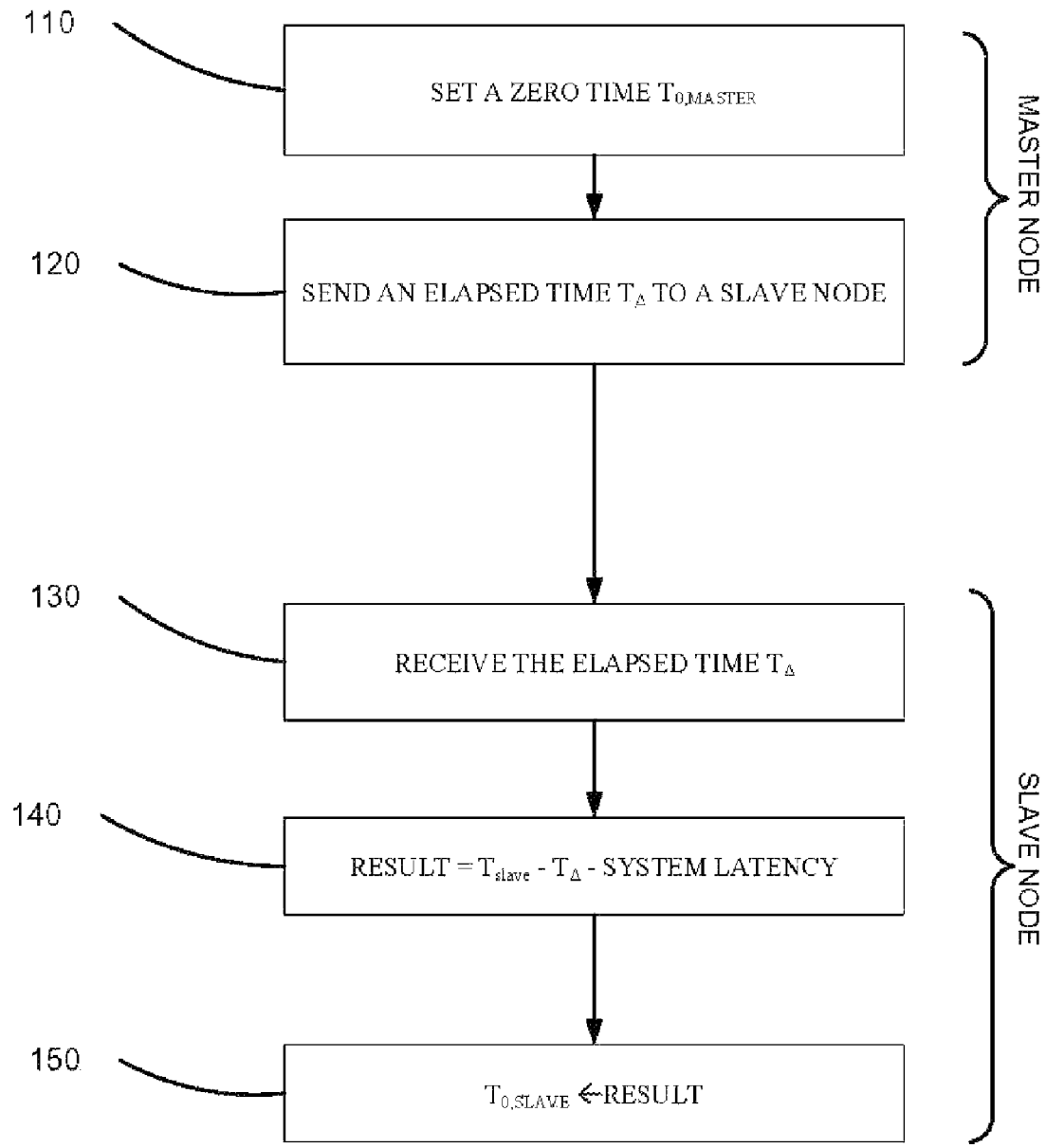
FIG. 5 is a simplified flow diagram of a method of network node synchronization according to a preferred embodiment of the present invention.

Reference is now made to FIG. 5, which is a simplified flow diagram of a method of network node synchronization according to a preferred embodiment of U.S. Ser. No. 11/987,360.

A network node which is to be a master in the synchronization process sets some arbitrary time as a base time $T_{0,master}$ (110). This action can happen at any time up to a beginning of the synchronization process.

The master calculates an elapsed time $T_A$ since $T_{0,master}$, and sends the $T_A$ to a slave (120).

The slave receives the elapsed time $T_A$ (130).

The slave subtracts the elapsed time $T_A$ and a system latency from its local high resolution clock time $T_{slave}$, thereby producing a result (140), which is a first estimate of base time. The first estimate may be enough for synchronization, or may not be enough. The subject of when to stop synchronization will be further described below, with reference to FIG. 6.

Finally the slave sets its own base time, $T_{0,slave}$, to be equal to the result (150).

In some embodiments of U.S. Ser. No. 11/987,360, the process of synchronization continues iteratively, performing acts described in references 120 to 150 of FIG. 5 several more times, with the following caveat, that the slave updates the value of base time $T_{0,slave}$ only if the result is prior to the $T_{0,slave}$ which is already set.

In some embodiments of U.S. Ser. No. 11/987,360, the slave receives several values of the elapsed time $T_A$ from the master, and subtracts the values of the elapsed time $T_A$ from its local clock, thereby producing several estimations of $T_{0,slave}$. The slave uses the several values to estimate a value of $T_{0,slave}$ which is closer to $T_{0,master}$, than even the earliest $T_{0,slave}$. The slave comprises a model of the statistical variance of the network latency. The variance of the several estimations of $T_{0,slave}$, corresponds to the variance of the network latency. The slave estimates a value for a minimum network latency based on the sampled variance of the network latency, without actually receiving an elapsed time which was received from the master after a minimum network latency.

In some embodiments of U.S. Ser. No. 11/987,360 the master synchronizes more than one slave. The master can send elapsed times to more than one slave at a time, using suitable methods. The suitable methods include, by way of a non-limiting example, broadcasting to all the slaves; sending separately to each of the slaves; broadcasting to some slaves and sending separately to some slaves; synchronizing each slave sequentially, completing one after the other; and various combinations of the above.

In some embodiments of U.S. Ser. No. 11/987,360 one network node acts as a master for more than one group of nodes. The master can set more than one $T_{0,master}$, and sends elapsed times from each of the $T_{0,master}$ values to nodes corresponding to the more than one group of nodes, thereby synchronizing the more than one group of nodes to different $T_{0,master}$ values.

In some embodiments of U.S. Ser. No. 11/987,360, the master sets a base time based on polling base times from other nodes on the network. By way of a non-limiting example, when the nodes on the network already have local values of internal clocks, the master node polls the nodes for their local clock values, averages the local clock values and uses the average to set the $T_{0,master}$ value.

In some embodiments of U.S. Ser. No. 11/987,360 the master node uses a different statistical value of the local clock values. By way of a non-limiting example, the different statistical value is a minimum of the local clock values; a maximum of the local clock values; a median of the local clock values; and so on.

Figure 6:
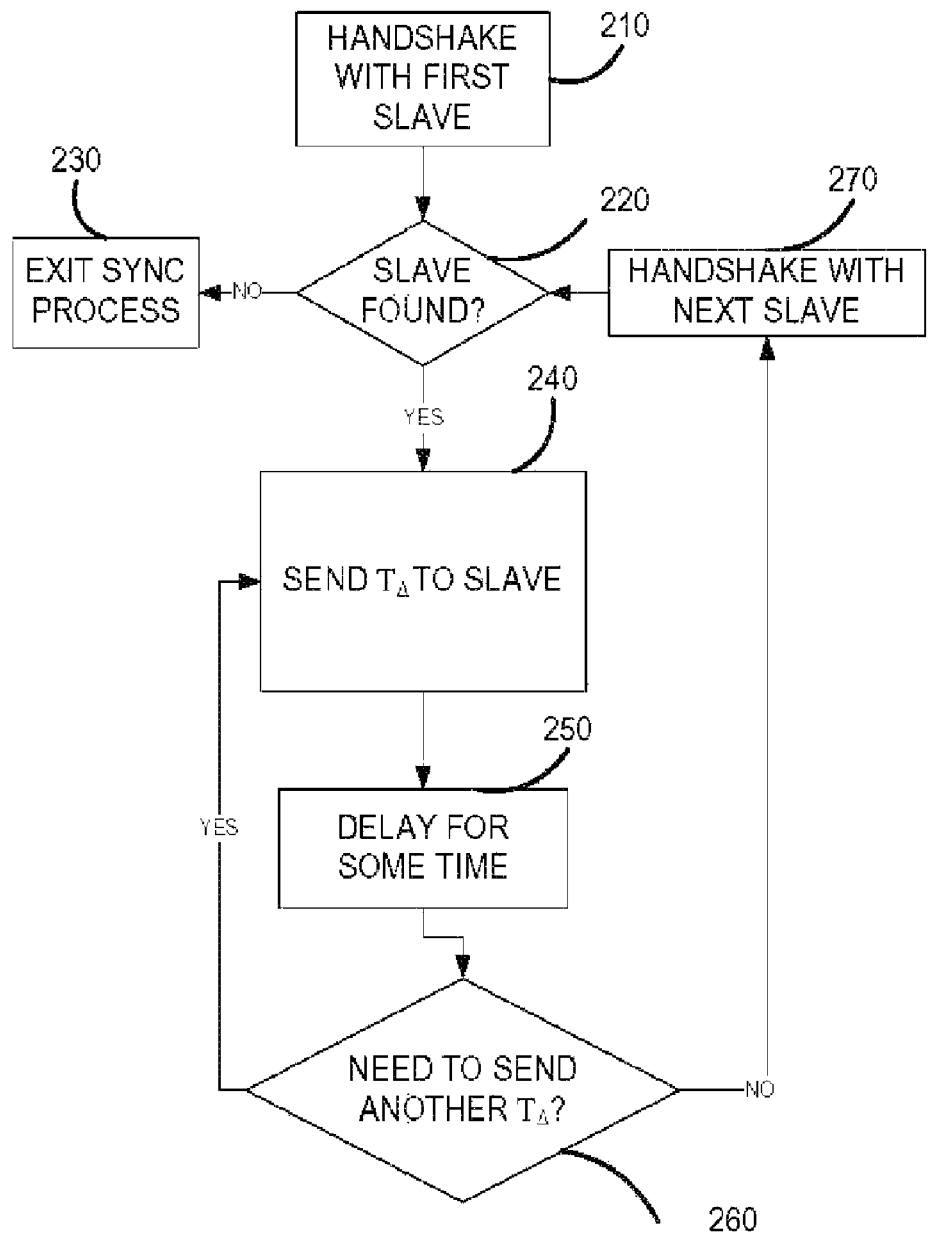
FIG. 6 is a more detailed flow diagram of a synchronization process at a master network node, according to an exemplary embodiment of the method of FIG. 5.

Reference is now made to FIG. 6, which is a more detailed flow diagram of a synchronization process at a master network node, according to an exemplary embodiment of the method of FIG. 5.

The master starts the synchronization process by sending a handshake message to a first slave (210).

If the slave responds to the handshake (220), then the slave is ready for the synchronization process, and the master continues the synchronization process (240). If no slave responds to the handshake, then there is no slave to synchronize with, and the master exits the synchronization process (230).

The master continues the synchronization process, and sends an elapsed time $T_A$ since $T_{0,master}$ to the slave (240).

The master then delays for some time (250), after which the master checks whether there is a need to send data with another $T_A$ to the slave (260).

The time of delay (250) is determined by the type of network and by quality of communications between master and slave. The delay is intended to allow the slave time to process the received $T_A$, and in order not to clutter the network, which may be used for additional purposes.

If the master determines that there is a need to send another packet with $T_A$ to the slave, then the master sends another packet with $T_A$ to the slave (240), and repeats the process of 240 to 260. If not, the master proceeds to send a handshake message to another slave (270).

In order to be able to play music using mobile phone nodes, some requirements must be fulfilled. The system described above is required to support the continuation of the music play in changing circumstances such as the loss of a node during play time (due to reasons such as running out of battery, incoming call, loss of wireless connection, etc.), the addition of a regular node at a later stage, or the joining of an enhanced sound node at a later stage, as may be, for instance, the sound system of a car into which the participants are moving.

Therefore, if full functionality is to be achieved, the protocol is preferably required to support the following:

a) Synchronization of each sound node that joins the sound network;

b) Sound Capabilities publishing (Master only);

c) Automatic sound configuration that is based on the sound capabilities of the sound nodes;

d) Preference-based sound configuration. In the case of an audio file that is separated by instruments and/or in the case of audio file that is separated into different surround channels, each node user can request (or suggest) his part to the Master (thus giving a "performance"-like effect, in which every speaker plays a different instrument);

e) Conveying sound parameters for existing surround algorithms. For example: if surround 4.1 is being used, then the parameters are roles (Left, Right, Rear-Left, Rear-Right) and their intensities;

f) Extensions of new surround algorithms (send surround decoding algorithms to client nodes that do not have the extension installed). For example, one of the nodes will have a bass enhancement sound algorithm for devices which can act as a "sub-woofer";

g) Handling of stream data (standard existing protocol can be used for that, for example RTP/RTCP); The source can be a file, or internet radio multicast.

h) Smart Recovery. In cases that one or more of the nodes cannot execute their part (e.g. incoming call, disconnected, low battery, etc.), the Master can select a new valid surround configuration and publish it immediately to the other nodes. The change minimizes the impact of the loss of the previous configuration, thus enabling to compensate for loss of channels by enhancing the sound with additional channels (targeting continuous sound playing);

i) The system should enable saving/caching of played stream, thus giving the client the option to save the file and play it later;

j) A user will be able to elect, in the case of incoming call during music playing, to continue playing the song using the speaker phone, but taking the call using the earphone;

k) The system should conveniently enable changing Masters, to deal with a case in which the Master leaves the net.

Example of a Smart Recovery System

An example of a smart recovery system is shown in Table 1 below, which illustrates the results of a variety of events.

TABLE 1

|  |  | Possible Configurations Normal Play | Loss | Result |
|---|---|---|---|---|
| Occurring Events | 2 Sound Nodes | 1 R, 1 L | Right | 1 L Plays All |
|  | 3 Sound Nodes | 1 R, 1 C, 1 L | Right | 1 C = 1 R, 1 L |
|  | 3 Sound Nodes | 1 R, 1 C, 1 L | Center | 1 R, 1 L |
|  | 4 Sound Nodes | R, L, RR, RL | RR | R, L, C |

Highly Adaptive Mobile Protocol

The HAMP (Highly Adaptive Mobile Protocol) protocol will be defined in detail below:

Terms

Sound node—every mobile device that is part of the sound network. Each sound node has an id, unique for that session.

Sound network(SN)—a group of one or more sound nodes interconnected with HAMP.

Sound Master(SM)—sound node which is the controller of the sound for actions such as Volume, balance, treble.

Sound configuration—chosen by the Sound Master, that dictates the behavior of the sound network in terms of sound distribution.

Sound Network Event—any event which is initiated by SM to SN or from external cause such as phone call or battery low, which causes a Sound Node to exit the SN, or a new Sound Node.

Sound Scheme—any type of sound distribution and the sound alteration of each sound node based on the given channel, e.g. if a sound node receives a stereo sound but has a sound role of Left speaker, it needs to pan to the left.

Sound Role—each Sound node takes on, based on the sound scheme.

Sound Capabilities—each Sound node publishes its capabilities in terms of max volume, quality, dynamic frequency range, number of speakers (in case of stereo mobile device), CPU, memory, software version.

Sound queries—typical Q&A between nodes for availability of resources, such as, Is there a specific media file?

Protocol Services

The following services are provided by the protocol:

Play control (e.g Start, Stop, Volume, Pan).

Sound Event handling—In case of sound event—exemplary Sound node Y has left the network.

Sound control—allows to control the sound similar to a ordinary audio system, such volume, treble, bass.

Sound Sync—provides a mechanism, as described in U.S. patent application Ser. No. 11/987,360, of the same assignee hereof, which describes a master-slave synchronization allows for a jitter of 1 ms around the synced time. The synchronization is done by the master giving a precise numbered "ticks" every predefined time in ms (around 100 ms each), all the time, or during a limited time, enough for the synchronization to be sufficiently precise. Each slave receives this "tick" and adjusts its time to the time tick received from the master. This method assumes precise clocks in 1 ms or less precision in each of the participating nodes (master and slave). The synchronization answers the question for all slaves—what is the "starting" time for counting the time for each of the slave nodes.

Convey media data upon demand from any sound node, depending on the bandwidth. Meaning that if the bandwidth is too low, only one specific channel can be passed (thus consuming more CPU). This method will probably will have less chance of being adopted in the near future, since the bandwidth of short range wireless constantly increases and will reach approximately 400 Mbit/s which can satisfy higher quality bit-rate compressions.

A typical sound network is schematically illustrated in FIG. 1. In this figure the Master operates three sound nodes, which play the role of left, center and right speakers.

Figure 2:
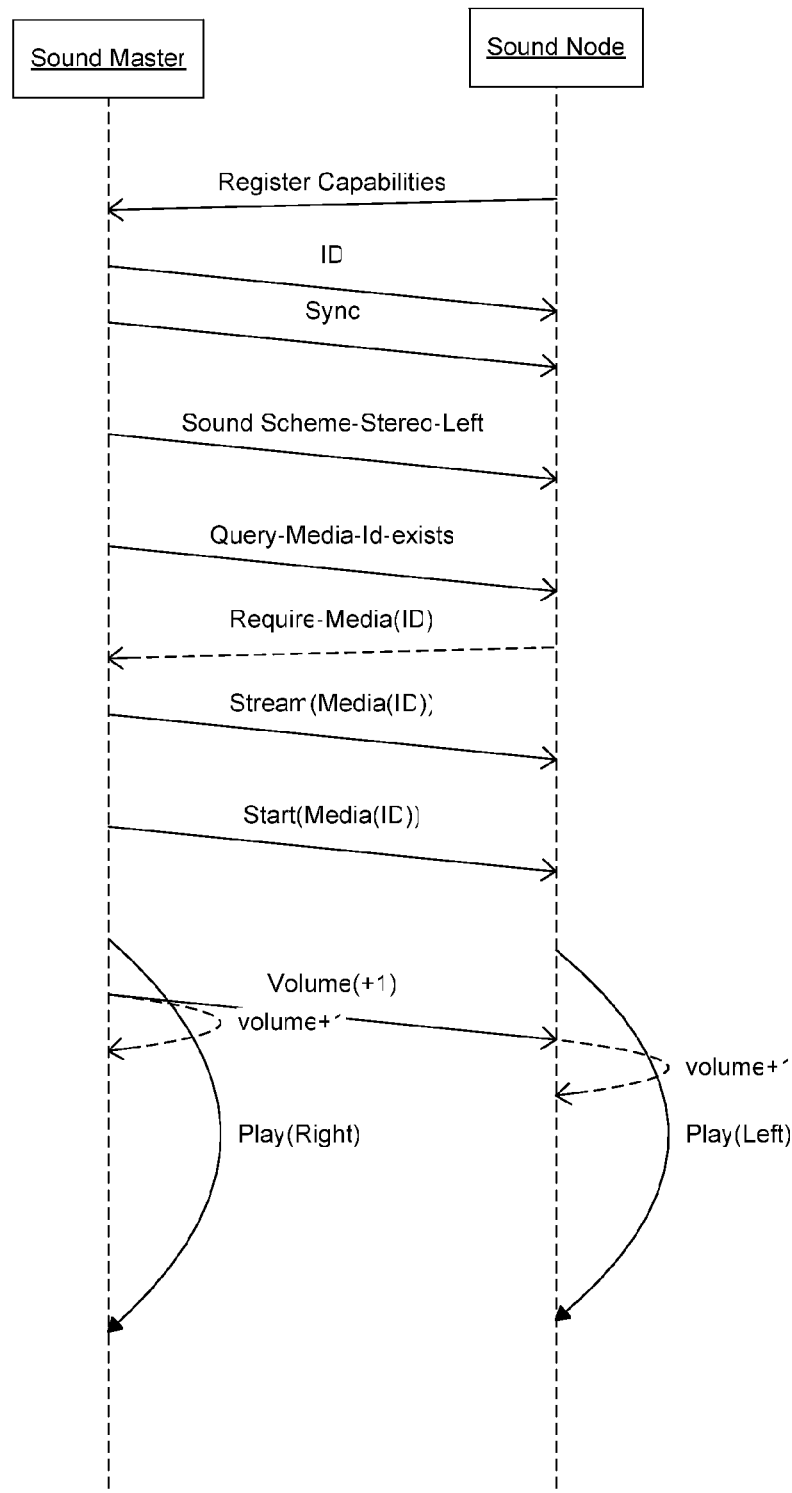
FIG. 2 is a sequence diagram demonstrating a stereo system.

FIG. 2 is a sequence diagram that demonstrates a stereo system, in which left and right speakers are played using two mobile handset devices.

As will be appreciated by those skilled person, the under layer protocol according to one embodiment of the invention is connection-oriented, and if it is not, the connection orientation needs to be dealt within a protocol middle layer that gives that capability (meaning that if the IP network is used, the TCP protocol will be used for that purpose, and if the BT network is used, the TCP is not needed since the data link is connection oriented).

Figure 3:
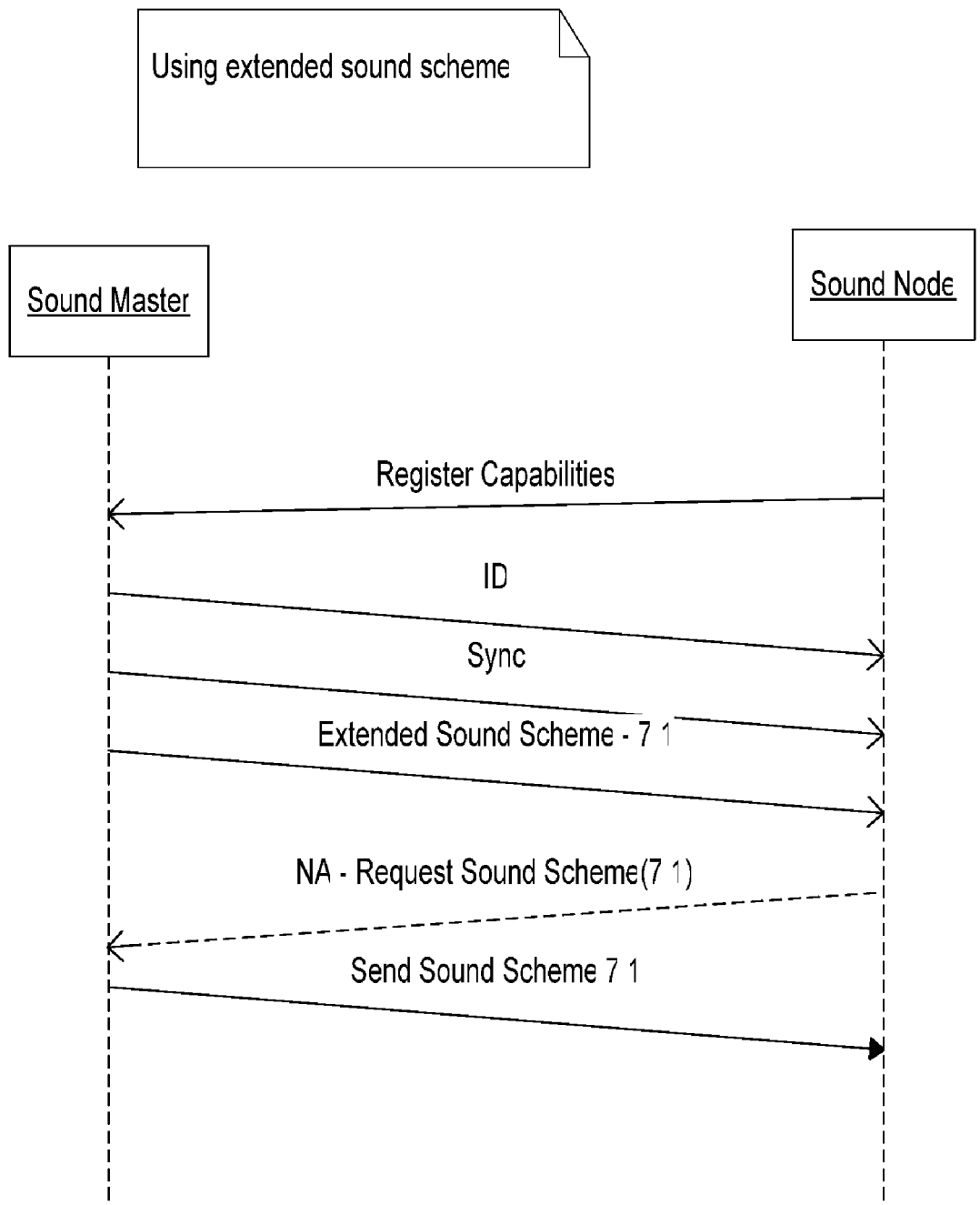
FIG. 3 is an example of a Sound Scheme Extension case.

FIG. 3 schematically illustrates using an extended sound scheme. As previously mentioned the invention includes the ability to extend the sound scheme to schemes not available during the development of the protocol. The schemes are ever evolving and changing, thus extension is crucial for the relevance of the system proposed. The diagram shows how an extension is sent to devices which do not support a newer sound scheme, say, 7.1 (which defines 7 speakers and 1 base).

Figure 4:
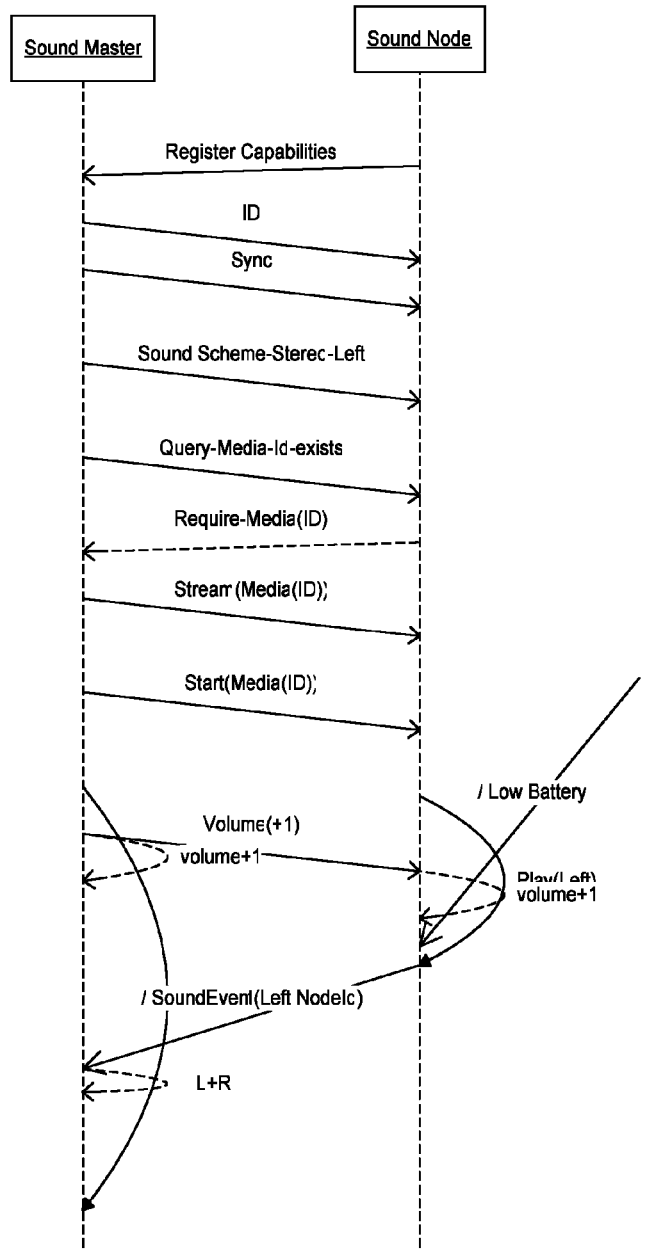
FIG. 4 schematically illustrates a recovery scenario according to one embodiment of the invention.

FIG. 4 illustrates a recovery scenario in which one of the sound nodes has a low battery and therefore abandons the network. This figure shows a simple example, where two devices play Left channel and Right channel of a stereo song, and one device hits a low battery. When a device has low battery level, it automatically exits all active applications, and specifically the application described herein. Now, when a node exits from a sound group, it immediately affects the audio, because the user hears the sound coming from only one channel, say the Left channel, which is still playing. In order to compensate for the loss of one speaker, the system notifies the master that a right speaker is "down" and a compensation scheme is needed to be activated. Since there were only two speakers to begin with, and now there is only one, the only solution will be adding Left and Right channels together, thus actually reverting to the normal mode which is "mono" (an exception can be made if the single device has a stereo set of speakers which means that it will play Left and Right channels on its integrated speakers.

The above description has been given for the purpose of illustration and is not intended to limit the invention in any way. As will be appreciated by the skilled person, many different schemes can be implemented, using different notes with varying capabilities, without exceeding the scope of the invention.

The invention claimed is:

1. An ad-hoc Adaptive Wireless Mobile Sound System, comprising:
   a) two or more mobile phone nodes;
   b) a Master device for sending a message/query to said two or more mobile phone nodes, to verify whether they hold in their memory a specific song/track and to learn their music playing capabilities;

c) transmission means provided in the Master, for conveying to the mobile nodes that do not have a specific file in their memory, if any, a compressed audio stream of said file;

d) software for conveying, in a streaming fashion, the compressed audio file over wireless connectivity;

e) software provided in the Master for selecting, based on an answer to said query, a basic surround scheme/algorithm configuration that takes into account the mobile nodes capabilities;

f) communication means provided in the Master to publish said basic surround scheme/algorithm configuration by which a playing role/channel is allocated for each of the mobile nodes; and g) means provided in the Master to synchronize the mobile nodes and to order them to play a stream audio file according to the basic surround scheme;

wherein the Master is operable to support continuation of the music being played by a substantially similar sound distribution despite a loss of a non-executable node found incapable of executing its allocated role/channel during play time by performing a Smart Recovery operation to minimize impact of the loss of said non-executable node, the Master being operable during said Smart Recovery operation to select a compensating surround scheme, to allocate a compensating role/channel associated with said compensating scheme for said nodes other than said non-executable node, and to synchronize said other nodes so as to play said audio file, wherein sound parameters of at least one of said other nodes are different in said compensating surround scheme than in said basic surround scheme.

2. The system according to claim 1, wherein the Master is also operable to support the continuation of the music being played by a substantially similar sound distribution despite addition of a node at a later stage or joining of an enhanced sound node at a later stage.

3. The system according to claim 2, which is provided with means for the synchronization of each sound node that joins a sound network.

4. The system according to claim 1, wherein the Master device is a wireless mobile device.

5. The system according to claim 4, wherein the Master is one of the two or more mobile phone nodes.

6. The system according to claim 4, wherein the Master is changeable.

7. The system according to claim 1, wherein the Master device is a dedicated device.

8. A method for the adaptive ad-hoc playing of music using a plurality of wireless mobile devices, comprising the steps of:

a) providing a plurality of mobile phone nodes and a Master device for controlling sound actions of each of said plurality of nodes;

b) publishing by the Master a basic surround scheme/algorithm configuration that takes into account capabilities of said mobile nodes by allocating a playing role/channel to each of said mobile nodes;

c) synchronizing said mobile nodes by the Master and ordering them to play a stream music file according to said basic surround scheme d) when one of said nodes malfunctions during play time, selecting a compensating surround scheme by allocating a compensating role/channel associated with said compensating scheme for said nodes other than said malfunctioned node; and e) synchronizing said other nodes so as to play said music file while continuing the music being played by a substantially similar sound distribution despite a loss of said malfunctioned node, wherein sound parameters of at least one of said other nodes are different in said compensating surround scheme than in said basic surround scheme.

9. The method according to claim 8, further comprising the steps of:

a) joining additional mobile phone nodes to the plurality of nodes; and b) synchronizing the plurality of nodes and said additional nodes by the Master to play the stream music file while continuing the music being played by a substantially similar sound distribution despite the joining of said additional nodes.

10. The method according to claim 8, wherein an automatic basic and compensating sound scheme is performed, based on sound capabilities of the plurality of nodes.

11. The method according to claim 8, wherein the basic and compensating sound schemes are preference based.

12. The method according to claim 8, further comprising conveying sound parameters for existing surround algorithms.

13. The method according to claim 8, further comprising providing extensions of new surround algorithms, to send surround decoding algorithms to client nodes that do not have the appropriate extension installed.

14. The method according to claim 8, comprising handling stream data.

15. The method according to claim 14, wherein handling is performed by using standard existing protocol such as RTP/RTCP.

16. The method according to claim 8, further comprising allowing saving/caching of played stream for later playing.

17. The method according to claim 8, wherein a user is able to elect, in the case of an incoming call during music playing, to continue playing the music using a speaker phone, but taking a call using an earphone.

18. The method according to claim 8, further comprising Masters changing capabilities.

19. The method according to claim 8, wherein the Master performs the following operations prior to publishing the basic scheme:

a) sending a message/query to the plurality of nodes, to verify whether they hold in their memory a specific song/track and to learn their music playing capabilities;

b) following said message/query, conveying to the nodes that do not have a specific file in their memory, a compressed audio stream of said file;

c) assigning to each file a digital signature that is embedded in the file's metadata, before sending it to one of the nodes; and d) once the Master receives an answer to its message/query, selecting the basic surround scheme/algorithm configuration that takes into account the mobile nodes capabilities.

* * * * *